United States Patent [19]

Peters et al.

[11] Patent Number: 5,143,671
[45] Date of Patent: Sep. 1, 1992

[54] FLUIDIZED BED PROCESS FOR TREATING PIGMENTS

[75] Inventors: Kimberly T. Peters, Johnson City; E. Phillip Smith, Blountville; Shane K. Kirk, Church Hill, all of Tenn.

[73] Assignee: Eastman Kodak Company, Rochester, N.Y.

[21] Appl. No.: 607,409

[22] Filed: Oct. 31, 1990

[51] Int. Cl.$^5$ .............................. C08K 5/36; B29B 9/12
[52] U.S. Cl. .............................. 264/117; 23/313 FB; 106/503; 427/213
[58] Field of Search ............... 264/117, 7; 23/313 FB; 106/503, 505; 427/213

[56] References Cited

U.S. PATENT DOCUMENTS

| | | | |
|---|---|---|---|
| 3,348,959 | 10/1967 | Csonka et al. | 106/503 X |
| 4,255,375 | 3/1981 | Macpherson et al. | 264/117 |
| 4,778,835 | 10/1988 | Sittel et al. | 523/315 |
| 4,909,853 | 3/1990 | Wienkenhover et al. | 106/503 |
| 5,026,429 | 6/1991 | Mronga et al. | 427/213 X |

FOREIGN PATENT DOCUMENTS

WO87/07289 12/1987 PCT Int'l Appl. .

OTHER PUBLICATIONS

Derwent Abstract WPI Acc No.: 81-36640D/21-EP 28 379.
Derwent Abstract WPI Acc No.: 74-52183V/29-FR 2 212 401.
Derwent Abstract WPI Acc No.: 78-78497A/44-FR 2 387 270.

Primary Examiner—Mary L. Theisen
Attorney, Agent, or Firm—Thomas R. Savitsky; Betty J. Deaton; William P. Heath, Jr.

[57] ABSTRACT

This invention relates to a process for treatment of pigments and the compositions of treated pigments using the disclosed process. Particularly, this invention describes a process for producing non-dusty, free flowing, granular pigment materials in which the pigment is treated by a water-dissipatable polyester. The treated pigment materials generally exhibit high dispersibility in water and polar solvent systems. Dispersions of such materials provide film-forming characteristics, water-resistivity and excellent adhesion when applied to the skin. The pigment materials prepared by the disclosed process are suitable for incorporation in paints, inks, cosmetic bases, liquid make-ups or other cosmetic preparations such as mascara.

31 Claims, No Drawings

FLUIDIZED BED PROCESS FOR TREATING PIGMENTS

FIELD OF INVENTION

The present invention concerns a fluidized bed process for treating pigments wherein the binder for such process is a certain polyester.

BACKGROUND OF THE INVENTION

Treatment of pigment surfaces is a well-known art in the field of coating, cosmetic and ink technology. Usually it involves adsorbing a surface-modifying agent such as polymer, surfactant, oil, etc., to pigment surfaces through dispersing the pigment in a liquid vehicle. The conventional dispersing (or grinding) equipment, for example, are three-roll mills, stone and colloid mills, and high-speed impingement mills. The conventional art of pigment dispersion is taught in a textbook by T. C. Patton, titled "Paint Flow and Pigment Dispersion", 2nd edition, Wiley Interscience, New York, 1978.

Fluidized-bed technology has been reported in U.S. Pat. No. 4,264,552 as a successful technique for treating pigments wherein certain types of granulating assistants for the process are disclosed. One of the types of granulating assistants disclosed in this patent as being useful is a water-soluble polymeric agent.

We have discovered an improvement in the fluidized bed process for treating pigments utilizing certain water-dissipatable polyesters as hereinafter described, wherein the treated pigments have improved properties.

SUMMARY OF THE INVENTION

The present invention is directed to a process for producing a treated granular pigment product in a fluidized bed using a binder as a granulating assistant. The improvement of the present invention comprises the use of at least one water-dispersible, sulfonate group-containing polyester as the binder.

DETAILED DESCRIPTION OF THE INVENTION

The fluidized bed process of the present invention can be carried out by processes taught in the art except that the polyester of the invention is employed as a granulating assistant. Such similar fluidized bed processes are taught in U.S. Pat. Nos. 4,264,552; 3,880,968; and 4,277,288, incorporated herein by reference in their entirety.

The polyester used in the process of the invention functions to:

(i) wet out the pigment powder surface sufficiently to allow agglomeration of pigment particles so wetted out, and (ii) bind granules so formed sufficiently strongly to enable them to resist breakdown during the process and during subsequent handling and storage, but without adversely affecting dispersibility in the final application medium.

In addition, the polyester also results in a treated pigment product having improved properties. More specifically, the process of this invention results in making treated pigment materials which exhibit at least one of the desirable properties given below:

a. dispersible in aqueous or polar solvent systems—the material can be dispersed in aqueous or polar solvent to form a fine uniform pigment dispersion.

b. film-forming—when a dispersion of the treated pigment is applied to skin, it has a smooth feel and results in a flexible, smudge-proof, and water-resistant film.

c. non-dustiness—the material is a non-dusty, free flowing, granular product.

d. ease for direct incorporation into color cosmetic formulations such as liquid make-up or mascara.

The treated pigment material can be prepared by spraying a dispersion of water-dissipatable polymer onto a fluidized bed of pigment. The polymer dispersion wets out the pigment powder surface to allow agglomeration of pigment particles into granules. The polymer functions to improve the properties of the pigment in its end application, e.g. color cosmetic formulation, by enhancing the dispersibility of the pigment in aqueous medium, promoting film formation, skin adhesion and water resistance. The pigment/polymer ratio may be varied from 50/50 to 95/5. The preferred ratio is between 60/40 and 90/10 and the most preferred ratio is 70/30 to 85/15. The specific ratio chosen depends on the pigment and the desired end application.

Accordingly, the present invention provides a process for producing a substantially dry, low dusting, free-flowing granular pigment composition, comprising contacting a fluidized bed of pigment, a granulating assistant and water, removing granules so obtained. Preferred methods include:

(i) spraying the granulating assistant and water onto the fluidized bed of pigment; or (ii) incorporating all or part of the granulating assistant into the pigment prior to fluidization and spraying with water (or water and the remaining granulating assistant).

A particularly suitable pigment powder starting material is that produced in a conventional dry grinding or sieving process. If desired, prior to use in the present process, such dry-ground pigment powder may be treated to render it more suitable for granulation, e.g., by changing its surface properties by chemical means or by grinding less finely—the coarser the powder the less surface to be wetted out and bonded.

Further suitable pigment starting material can be produced from dryers which give pigment directly in powder form. Such pigment powders may be fully or partially dry and may be low dusting.

Typically, the primary particle size of pigment material is 10 $\mu$m or less. After granulation, typically the particle size of at least about 70 weight % of the treated, granular pigment product is greater than about 50 $\mu$m, more typically greater than about 100 $\mu$m.

Thus, the average particle size of the treated, granular pigment product is typically between about 75 $\mu$m and about 1000 $\mu$m, with a more typical average particle size being between about 125 $\mu$m and about 500 $\mu$m, even more typically between about 150 $\mu$m to about 300 $\mu$m.

Typical embodiments of the process for preparing the solid granular dispersible pigment materials of the invention are described in the following steps:

1. Preparing a dispersion of water dissipatable polymer. The concentration of the dispersion can be varied from 5 to 50% by weight providing the viscosity is suitable for spraying on the fluidized bed. Concentrations which are too dilute are economically undesirable in that longer spraying times are required. The preferred concentration of the polymer dispersion is 15-30% by weight. Dispersions are prepared by adding polymer pellets to heated water with sufficient agitation to maintain the pellets in suspension and continuing heating and agitation until all the pellets are dispersed. The water temperature may be from 75°-100° C. depending on the specific polymer used. The time required to disperse the pellets is usually from 20-30 minutes.

2. Charging the pigment powder into the bowl of the granulating apparatus. A typical apparatus is represented by a Glatt Air Techniques CPCG-5 Fluid Bed Granulator. Heated air is blown through the pigment powder to fluidize it. The temperature of the inlet air is within the range of ambient to 90° C., normally 40° to 60° C., and the outlet air temperature from the bed is in the range of 25° to 60° C. depending on the inlet temperature and the rate of dispensation of the polymer dispersion. The rate of the air flow is adjusted to give suitable fluidization of the powder. The rate of the air flow will vary depending upon such factors as machine size, batch size, pigment particle size, shape and density. It may also be varied during the granulation process as the size, shape and density of the pigment particles change and thereby change the fluidization characteristics.

3. Spraying polymer dispersion onto fluidized bed to form granules. The polymer dispersion is sprayed through a nozzle where it is atomized into the space above the fluidized bed. The droplet size is determined by atomization air volume and pressure, and spray rate. Spraying time will vary depending upon the concentration of polymer in the dispersion, the desired mount of polymer to apply, the rate of air flow and the temperature. Normally the spray time will be from 30 minutes to 3 hours.

4. Drying the granules. This is accomplished by continuing fluidization after the desired amount of polymer dispersion has been dispensed. The drying time varies from 1 to 30 minutes, depending on the desired moisture content which is usually 5% or less and most typically is less than 2%. The amount of drying can be estimated by observing the bed temperature. As the bed moisture decreases, the bed temperature approaches the inlet temperature. It is important however, not to allow the bed temperature to reach the glass transition temperature (Tg) of the polymer. If this occurs, the polymer will become sticky and fluidization of the bed will be lost.

The pigment materials useful in the process of the invention include water-insoluble, or sparingly water-soluble inorganic and organic pigments, and pearlants commonly used in cosmetics, paints, coatings, and inks.

Typical inorganic pigments include iron oxides of various colors (yellow, red, brown and black), ferric ammonium ferrocyanide (blue), manganese violet, ultramarine blue, chrome oxide (green), talc, zeolite, kaolin, titanium dioxide (white) and mixtures of said inorganic pigments. Typical pearlants include mica, bismuth oxychloride and treated mica such as titanated micas.

Organic pigments useful in this invention include natural colorants and synthetic monomeric and polymeric colorants. Typical examples are phthalocyanine blue and green pigments, diarylide yellow and orange pigments, and azo-type red and yellow pigments such as toluidine red, litho red, naphthol red and brown pigments.

Generally copolymer pigments useful in this invention are water insoluble polymers such as nylon powder, polyethylene and polyester colorants. The types of polyesters employed in this invention may include linear, thermoplastic, crystalline or amorphous materials produced using one or more diols and one or more dicarboxylic acids copolymerized with colorants. In general, the diol components of the polyester include examples such as neopentyl glycol, ethylene glycol, 1,4-cyclohexanedimethanol, 1,2-propanediol, 1,3-propanediol, 1,6-hexanediol, 1,2-cyclohexanediol, 1,4-cyclohexanediol, 1,10-decanediol, 1,2-cyclohexanedimethanol, 1,3-cyclohexanedimethanol, X,8-bis(hydroxymethyl) tricyclo-[5.2.1.0]-decane, wherein X represents 3, 4, or 5, and diols containing one or more oxygen atoms in the chain, e.g. diethlyene glycol, triethylene glycol, dipropylene glycol, or tripropylene glycol and the like. These diols contain 2 to 18, preferably 2 to 12, carbon atoms. In addition, cycloaliphatic diols can be used in their cis and trans configuration or as a mixture of both forms. The acid components (aliphatic, alicyclic, or aromatic dicarboxylic acids) of the polyester may consist of terephthalic acid, naphthalene2,6-dicarboxylic acid, isophthalic acid, 1,4-cyclohexanedicarboxylic acid, 1,3-cyclohexanedicarboxylic acid, succinic acid and the like. The anhydride and esters of the dicarboxylic acids can likewise be employed.

The colorants copolymerized with polyesters include 2,2'-((9,10-dihydro-9,10-dioxo-1,5-anthracenediyl)-diimino) bis-benzoic acid, methyl 3-[4-[[2-(acetyloxy)ethyl] ethylamino]-2-methylphenyl]-2-cyano-2propenoate, 1,5-bis[(3-hydroxy-2,2-dimethylpropyl)amino]anthraquinone and other dyes containing two reactive primary alcohol, acid, ester or acetyloxy groups. The colorant content in the polymer is in the range of 8-50%.

Exemplary pigments useful in the present invention include the C.I. pigment materials listed in the following table. It is noted that pigments having large amounts of ionizable cations are not preferred since they interfere with the water dispersibility of the polymer.

| Pigments | |
| --- | --- |
| Generic Name | C.A. Index/Chemical Name |
| C.I. Pigment Yellow 17 | Butanamide, 2,2'-[(3,3'-dichloro[1,1'-biphenyl] 4,4'-diyl)bis(azo)bis [N-(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-, ethyl ester, molybdate-silicate |
| C.I. Pigment Red 81:x | Benzoic acid, 2-[6-(ethylamino)-3-(ethylimino)-2,7-dimethyl-3H-xanthen-9-yl]-, ethyl ester, molybdate- |

-continued

| Pigments | |
|---|---|
| Generic Name | C.A. Index/Chemical Name |
| C.I. Pigment Yellow 83 | phosphate<br>Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide (TiO$_2$) |
| C.I. Pigment Blue 15 | Copper, [29H, 31H-phthalocyaninato (2-)-N$^{29}$, N$^{30}$, N$^{31}$, N$^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[3-methylphenyl)amino]phenyl]-[4-[(3-methyl phenyl)-imino]-2,5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl) |

-continued

| Pigments | |
|---|---|
| Generic Name | C.A. Index/Chemical Name |
| | azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis[N-(2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis[3-oxo-N-phenyl- |
| C.I. Pigment Yellow 55 | Butanamide, 2,2'-[(3,3'-dichloro[1,1'-biphenyl]-4,4'-diyl)bis(azo)]bis[N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis(azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis(azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthylamine in toluene with phosphorous oxychloride and converted to the copper ferrocyanide salt (PTMA salt in P. Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl)phenyl]azo]-N-(2-ethoxyphenyl)-3-hydroxy- |
| C.I. Pigment Red 88 | Benzo[b]thiophen-3(2H)-one, 4,7-dichloro-2-(4,7-dichloro-3-oxobenzo[b]-thien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4(diethylamino)phenyl][4-(ethylamino)-1-1 naphthalenyl]methylene]-2,5-cyclohexadien-1-ylidene]-N-ethyl-, [orthosilicato(4-)] hexatriacontaoxododecamolybdate(4)-(4:1) |
| C.I. Pigment Red 3 | 2-Naphthalenol, 1-[(4-methyl-2-nitrophenyl)azo]- |
| C.I. Pigment Blue 15:1 | Copper,[29H, 32H-phthalocyaninato(2-)-N$^{29}$, N$^{30}$, N$^{31}$, N$^{32}$]-,(SP-4-1)-<br>or Copper,[chloro-29H, 31H-phthalocyaninato (2-1)-N$^{29}$, N$^{30}$, N$^{31}$, N$^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-tri- |

-continued

| Pigments | |
|---|---|
| Generic Name | C.A. Index/Chemical Name |
| | chlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P. Red 81:1). |
| C.I. Pigment Orange 13 | 3H-Pyrazol-3-one, 4,4'-[(3,3'-dichloro [1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl) azo]-3-hydroxy-N-(4-methylphenyl)- |
| C.I. Pigment Blue 1:X | Ethanaminium, N-[4-[[4-(diethylamino)phenyl] [4-(ethylamino)-1-naphthalenyl]methylene]-2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3$.x $MnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

The polyesters useful in this invention as a granulating assistant comprise linear, water-dissipatable polymers having an inherent viscosity of at least 0.1 and preferably at least 0.2 and more preferably at least 0.3 (measured as described hereinbelow) and a glass transition temperature ranging from 25 to 90° C. when the polymers are in the dry state. When the polymers contain 1-25% water of its own weight, the glass transition temperatures ("Tg"s, as measured by differential scanning calorimetry (DSC)) may drop to a lower range usually below 50° C. The polymer compositions useful in this invention are polyesters and polyesteramides described in U.S. Pat. Nos. 3,546,008, 3,734,874, 3,779,993 and 4,233,196, incorporated herein by reference in their entirety.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include succinic, glutaric, adipic, azelaic, sebacic, itaconic, 1,4-cyclohexanedicarboxylic, phthalic, terephthalic and isophthalic. If terephthalic acid is used as the carboxylic acid component of the polyester, superior results are achieved when at least 5 mole percent of one of the other acids is also used.

It should be understood that use of the corresponding acid anhydrides, esters, and acid chlorides of these acids is included in the term "dicarboxylic acid".

Other suitable acids are disclosed in, for example, U.S. Pat. No. 3,779,993.

The difunctional sulfo-monomer component of the polyester or polyesteramide may advantageously be a dicarboxylic acid or an ester thereof containing a metal sulfonate group or a glycol containing a metal sulfonate group or a hydroxy acid containing a metal sulfonate group. The metal ion of the sulfonate salt may be $Na^+$, $Li^+$, $K^+$ and the like. The resulting polyesters or polyesteramides are less readily dissipated by cold water and more readily dissipated by hot water. It is possible to prepare the polyester or polyesteramide using, for example, as sodium sulfonate salt and later by ion-exchange replace this ion with a different ion, and thus alter the characteristics of the polymer. The difunctional monomer component may also be referred to as a difunctional sulfmonomer and is further described hereinbelow.

Advantageous difunctional sulfo-monomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Particularly superior results are achieved when the difunctional sulfo-monomer component is 5-sodiosulfoisophthalic acid or its esters and the glycol is a mixture of ethylene glycol or 1,4-cyclohexanedimethanol with diethylene glycol.

When the sulfonate-containing difunctional monomer is an acid or its ester, the polyester or polyesteramide should contain at least 8 mole percent of said monomer based on total acid content, with more than 10 mole percent giving particularly advantageous results. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

In the preferred form of the present invention, at least part of the glycol component contains repeating units of a poly(ethylene glycol) of the formula H—(OCH$_2$—CH$_2$)$_n$—OH wherein n is an integer of 1 to 500, more preferably 2 to about 500. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight percent of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax", a product of Union Carbide. Diethylene glycol is also especially suitable.

Other useful glycols for preparing copolyesters may consist of aliphatic, alicyclic, and aralkyl glycols. Examples of these glycols include ethylene glycol; propylene glycol; 1,3-propanediol, 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

Accordingly, said polyester preferably comprises repeat units from (a) at least one difunctional dicarboxylic acid, (b) from about 2 to about 25 mole %, based on a total of all acid, hydroxyl and amino equivalents being equal to 200 mole %, of at least one difunctional sulfomonomer containing at least one sulfonate group of the formula $-SO_3M$ wherein M is H, a metal ion, or a nitrogen-containing basic group, and wherein said sulfonate group is attached directly to an aromatic nucleus and the functional groups of said sulfomonomer are hydroxy, carboxy, amino or a mixture thereof, and (c) at least one glycol or a mixture of a glycol and a diamine having two —NRH groups, the glycol containing two —CH$_2$—OH groups, wherein R is H or an alkyl group of 1 to 4 carbon atoms.

More preferably, said polyester comprises repeat units from (a) at least one difunctional aromatic, saturated aliphatic or saturated alicyclic dicarboxylic acid, (b) from about 4 to about 25 mole %, based on a total of all acid, hydroxyl and amino equivalents being equal to 200 mole %, of said difunctional sulfomonomer, (c) at least 0.1 mole %, based on a total of all acid, hydroxyl and amino equivalents being equal to 200 mole %, of a poly(ethylene glycol) of the formula:

$H-(OCH_2-CH_2)_n-OH$ wherein n is an integer of 1 to about 500, preferably 2 to about 500, and (d) none to about 40 mole %, based on a total of all acid, hydroxyl and amino equivalents being equal to 200 mole %, of a difunctional hydroxycarboxylic acid having one —CR$_2$—OH group, and aminocarboxylic acid having one —NRH group, an aminoalcohol having one —CR$_2$—OH group and one NRH group, a diamine having two NRH groups, or a mixture thereof, wherein each R, independently, is as previously defined.

Even more preferred is wherein said polyester is a polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows, wherein all stated mole percentages are based on the total of all acid, hydroxyl, and amino equivalents being equal to 200 mole %:

(a) at least one difunctional dicarboxylic acid;

(b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;

(c) at least one difunctional reactant selected from a glycol or a mixture of a glycol and diamine having two —NRH groups, the glycol containing two —CH$_2$—OH groups of which (1) at least 15 mole % is a poly(ethylene glycol) having the structural formula $H-(OCH_2-CH_2)_n-OH$, n being an integer of from 1 to about 20, preferably 2 to about 20, or (2) of which from about 0.1 to less than about 15 mole % is a poly(ethylene glycol) having the structural formula $H-(OCH_2-CH_2)_n-OH$, n being an integer of between 1 and about 500, preferably 2 and about 500, and with the proviso that the mole % of said poly(ethylene glycol) within said range is inversely proportional to the quantity of n within said range; and (d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one NRH group, or mixtures of said difunctional reactants; wherein each R, independently, in the (c) and (d) reactants is H or an alkyl group of 1 to 4 carbon atoms.

More desirable polyesters are wherein said polyester consists essentially of an acid moiety of from about 75 to about 84 mole % isophthalic acid and conversely from about 25 to about 16 mole % 5-sodiosulfoisophthalic acid, and a glycol moiety of from about 45 to about 100 mole % diethylene glycol and conversely from about 55 to about 0 mole % 1,4-cyclohexanedimethanol or ethylene glycol or mixtures thereof; said polyester consists essentially of an acid moiety of from about 80 to about 90 mole % isophthalic acid and conversely from about 20 to about 1 mole % 5-sodiosulfoisophthalic acid, and said glycol moiety comprises from about 50 to about 100 mole % diethylene glycol and conversely from about 50 to about 0 mole % 1,4-cyclohexanedimethanol; and said polyester consists essentially of an acid moiety of from about 75 to about 85 mole % isophthalic acid and conversely from about 25 to about 15 mole % 5-sodiosulfoisophthalic acid, and a glycol moiety of from about 0 to about 20 mole % ethylene glycol and conversely about 100 to about 80 mole % 1,4-cyclohexanedimethanol.

Specific preferred polyesters are as follows:

wherein said polyester consists essentially of repeat units from about 89 mole % isophthalic acid, about 11 mole % 5-sodiosulfoisophthalic acid, and 100 mole % diethylene glycol, based on a total of 200 mole percent;

wherein said polyester consists essentially of repeat units from about 89 mole % isophthalic acid, about 11 mole % 5-sodiosulfoisophthalic acid, about 78 mole % diethylene glycol, and about 22 mole % 1,4-cyclohexanedimethanol;

wherein said polyester consists essentially of repeat units from about 82 mole % isophthalic acid, about 18 mole % 5-sodiosulfoisophthalic acid, about 54 mole % diethylene glycol, and about 48 mole % 1,4-cyclohexanedimethanol; and wherein said polyester consists essentially of repeat units from about 80 mole % isophthalic acid, about 20 mole % 5-sodiosulfoisophthalic acid, about 11 mole % ethylene glycol, and about 89 mole % 1,4-cyclohexanedimethanol.

Typical compositions are given as follows:

| Polyester Designation | IPA, Mole % | SIP, Mole % | DEG, Mole % | CHDM, Mole % | EG, Mole % | I.V. | Tg |
|---|---|---|---|---|---|---|---|
| A | 89 | 11 | 100 | 0 | 0 | .42 | 29 |
| B | 89 | 11 | 78 | 22 | 0 | .36 | 38 |
| C | 82 | 18 | 34 | 46 | 0 | .33 | 55 |
| D | 80 | 9 | 0 | 89 | 11 | .23 | 88 |

Where
IPA = isophthalic acid
SIP = 5-sodiosulfoisophthalic acid
DEG = diethylene glycol
CHDM = 1,4-cyclohexanedimethanol
EG = ethylene glycol
I.V. = inherent viscosity The above-described polyester designations are used in the Examples section hereof.

The treated pigment product of the invention exhibits high dispersibility in water and aqueous solutions containing minor amounts of lower alcohols ($C_1$–$C_4$), polyethylene glycols, DMF, DMSO or other polar solvents as may be desired for the end application. The treated pigment product of the invention and/or dispersions thereof are useful in many applications where a water dispersible pigment product is desired, such as in, for example, cosmetics, inks, paints, and soaps. Dispersions of the treated pigment product provide excellent film-forming characteristics, water-resistivity, and excellent adhesion when applied to the skin.

Accordingly, the present invention includes a cosmetic formulation (such as liquid make-up, cosmetic base or mascara) which contains the product of the process of the invention. A typical cosmetic composition preferably comprises (a) about 1 to about 60% by weight of the product of the process of the invention, (b) about 30 to about 90% by weight of a water phase which may contain one or more other water soluble materials such as botanicals, protein derivatives, gums, thickeners, humectants, preservatives, and optionally (c) about 10 to about 60% by weight of an oil phase which comprises one or more emollient oils such as isopropyl palmitate or similar esters, mineral oil, petrolatum, or vegetable oils; which also optionally contains one or more other oil soluble materials such as waxes, cetyl and/or stearyl alcohols, preservatives, fragrances and similar adjuvants, said percentages being based on the total weight of the composition.

If an oil phase is used in the cosmetic formulation, the two phases may be stabilized by emulsification using from about 1 to about 25% by weight of the total composition of at least one emulsifier. The emulsifier(s) can be selected from a wide range of materials such as ethoxylated alcohols, ethoxylated fatty acids and fatty esters, glycerol and glycol esters, lanolin derivatives, monoglyceride derivatives, sorbitan derivatives and similar adjuvants.

The following examples are to illustrate the invention but should not be considered as a limitation thereon.

EXAMPLES

EXAMPLE 1

This example demonstrates the preparation of a solid, nondusty granular pigment material by employing the process of this invention.

A 25% polymer dispersion of polyester B is prepared by adding the polymer pellets to water at 85° C. with agitation and mixing for 30 minutes.

The pigment (CI Pigment Black 11) is charged into the bowl of a Glatt Air Techniques CPCG-5 Fluid Bed Granulator. The process conditions are as follows:

| | |
|---|---|
| Pigment Weight | 8 Kg |
| Polymer Dispersion Weight | 8 Kg |
| Inlet Temperature | 55° C. |
| Bed Temperature | 26° C. |
| Outlet Temperature | 26° C. |
| Air Flow | 400 m$^3$/h |
| Atomization Pressure | 3 bar |
| Spraying Time | 72 min. |

Drying is continued until the bed temperature reaches 35° C.

The product is a low dusting, free flowing granular material with the composition of 4 parts pigment to 1 part polymer and showing the following particle size distribution:

| Particle Size (micron) | Weight Percent |
|---|---|
| >1000 | 0.2 |
| 850–1000 | 0.1 |
| 425–850 | 73.4 |
| 250–425 | 15.6 |
| 180–250 | 2.1 |
| 150–180 | 1.0 |
| <150 | 7.6 |

The untreated pigment is a very fine powder whose particle size distribution is 100% <125 μm. The angle of repose and flow rate of the granulated pigment is measured with a Pharma Test Flowmeter Type PTG which utilizes a 50 mm diameter funnel of 100 ml capacity and a 10 mm orifice. The angle of repose is 30.3° and the flow rate is 10.2 g/sec. The untreated pigment does not flow through the funnel.

EXAMPLE 2

This example demonstrates the preparation of an aqueous pigment dispersion using the material obtained in Example 1.

The pigment granules are dispersed in water by adding 1 part by weight to 3 parts by weight of water at 75°

C. and mixing for 15 minutes. The result upon cooling to room temperature is a fine uniform dispersion.

When the dispersion is applied to the skin it has a smooth and creamy feel. When allowed to dry, it forms a flexible colored film which is not washed off when held under warm running water even with gentle rubbing.

EXAMPLE 3

Titanium dioxide is charged into the bowl of a Glatt Air Techniques CPCG-5 Fluid Bed Granulator. The process conditions are described as follows:

| Pigment Weight | 8 Kg |
|---|---|
| Polymer Dispersion Weight | 8 Kg of 25% polyester B |
| Inlet Temperature | 54° C. |
| Bed Temperature | 27° C. |
| Outlet Temperature | 27° C. |
| Air Flow | 450 m³/h |
| Atomization Pressure | 3 bar |
| Spraying Time | 77 min. |

The product is a low dusting, free flowing granular material with the composition of 4 parts pigment to 1 part polymer and showing the following particle size distribution:

| Particle Size (micron) | Weight Percent |
|---|---|
| >1000 | 0.1 |
| 850–1000 | 0.1 |
| 425–850 | 11.9 |
| 250–425 | 63.5 |
| 180–250 | 15.1 |
| 150–180 | 3.6 |
| <150 | 5.8 |

Other physical characteristics are described as follows:

| Flow Rate | 6.5 g/sec |
|---|---|
| Angle of Repose | 32.2° |
| Bulk Density | 0.51 g/mL |
| Tapped Density | 0.60 g/mL |

The untreated titanium dioxide is a fine powder whose particle size distribution is 100% <125 μm. It does not flow through the funnel of the Pharma Test Flowmeter.

EXAMPLE 4

Black iron oxide (CI Pigment Black 11) is charged into the bowl of a Glatt Air Techniques GPCG-5 Fluid Bed Granulator. The process conditions are described as follows:

| Pigment Weight | 8 Kg |
|---|---|
| Polymer Dispersion Weight | 4.7 Kg of 30% polyester A |
| Inlet Temperature | 32° C. |
| Bed Temperature | 20° C. |
| Outlet Temperature | 19° C. |
| Air Flow | 450 m³/h |
| Atomization Pressure | 2.5 bar |
| Spraying Time | 76 min. |

The product is a free flowing granular material with the composition of 17 parts pigment to 3 parts polymer and showing the following particle size distribution:

| Particle Size (micron) | Weight Percent |
|---|---|
| >1000 | 0 |
| 850–1000 | 0 |
| 425–850 | 0.1 |
| 250–425 | 3.6 |
| 180–250 | 34.3 |
| 150–180 | 24.0 |
| <150 | 38.0 |

EXAMPLE 5

Pigment powder (CI Pigment Yellow 42) is charged into the bowl of a Glatt Air Techniques CPCG-5 Fluid Bed Granulator and granulated with polyester B. The process conditions are described as follows:

| Pigment Weight | 4 Kg |
|---|---|
| Polymer Dispersion Weight | 4 Kg of 25% polyester B |
| Inlet Temperature | 47° C. |
| Bed Temperature | 26.6° C. |
| Outlet Temperature | 26.6° C. |
| Air Flow | 400 m³/h |
| Atomization Pressure | 2.5 bar |
| Spraying Time | 44 min. |
| Drying Time | 5 min. |

The product is a free flowing granular material with the composition of 4 parts pigment to 1 part polymer. The physical characteristics are described as follows:

| Flow Rate | 5.8 g/sec |
|---|---|
| Angle of Repose | 29.8° |
| Bulk Density | 0.46 g/mL |
| Tapped Density | 0.58 g/mL |

| Particle Size Distribution | |
|---|---|
| Particle Size (micron) | Weight Percent |
| >850 | 0 |
| 425–850 | 0.1 |
| 250–425 | 3.6 |
| 180–250 | 34.3 |
| 150–180 | 24.0 |
| <150 | 38.0 |

The untreated pigment does not flow through the funnel of the Pharma Test Flowmeter. It is a fine powder with a particle size distribution of 100% <125 μm.

EXAMPLE 6

Red iron oxide (CI Pigment Red 101) is granulated with polyester C as follows:

| Pigment Weight | 4 Kg |
|---|---|
| Polymer Dispersion Weight | 7.143 Kg of 28% polyester C |
| Inlet Temperature | 56.4° C. |
| Bed Temperature | 32.3° C. |
| Outlet Temperature | 31.8° C. |
| Air Flow | 400 m³/h |
| Atomization Pressure | 2.5 bar |
| Spraying Time | 79 min. |
| Drying Time | 5 min. |

The product is a free flowing, non-dusty, granular product with the composition of 4 parts pigment to 1 part polymer. The physical characteristics are described below:

| Particle Size Distribution | |
|---|---|
| Particle Size (micron) | Weight Percent |
| >850 | 0 |
| 425–850 | 0.7 |
| 250–425 | 0.78 |
| 180–250 | 9.1 |
| 150–180 | 12.51 |
| 125–150 | 17.52 |
| <125 | 60.02 |
| Flow Rate | 5.3 g/sec |
| Angle of Repose | 33.5° |
| Bulk Density | 0.61 g/mL |
| Tapped Density | 0.74 g/mL |

The untreated pigment is a fine powder which does not flow through the funnel of the Pharma Test Flowmeter. It has a particle size distribution of 100% <125 μm.

EXAMPLE 7

Pigment powder (CI Pigment Yellow 42) is charged into the bowl of a Glatt CPCG-5 Fluid Bed Granulator and granulated with polyester D. The process conditions are described as follows:

| | |
|---|---|
| Pigment Weight | 4 Kg |
| Polymer Dispersion Weight | 8 Kg of 27.5% polyester D |
| Inlet Temperature | 68.2° C. |
| Bed Temperature | 45.6° C. |
| Outlet Temperature | 44.2° C. |
| Air Flow | 400 m$^3$/h |
| Atomization Pressure | 2.5 bar |
| Spraying Time | 97 min. |

The product is a free flowing granular material with the composition of 13 parts pigment to 7 parts polymer. The particle size distribution is given below:

| Particle Size (micron) | Weight Percent |
|---|---|
| >850 | 0 |
| 425–850 | 0.03 |
| 250–425 | 2.39 |
| 180–250 | 11.32 |
| 150–180 | 11.54 |
| 125–150 | 12.51 |
| <125 | 62.21 |

EXAMPLE 8

This example demonstrates the improved dispersibility and wettability of pigment material granulated with a water dissipatable polyester.

Fine talc is charged into the bowl of a Glatt Air Techniques CPCG-5 Fluid Bed Granulator and granulated with a dispersion of polyester C. The process conditions are described as follows:

| | |
|---|---|
| Pigment Weight | 8 Kg |
| Polymer Dispersion Weight | 10 Kg of 14% polyester C |
| Inlet Temperature | 57.3° C. |
| Bed Temperature | 31.6° C. |
| Outlet Temperature | 31.6° C. |
| Air Flow | 400 m$^3$/h |
| Atomization Pressure | 2.5 bar |
| Spraying Time | 115 min. |

Spraying is stopped and samples withdrawn after 0.6 Kg, 3 Kg, and 6.4 Kg dispersion have been dispensed. These samples represent talc to polymer compositions of 99/1, 95/5, and 90/10. The final composition is 85/15 talc to polymer.

An amount of each sample equivalent to 2 g of talc is slowly added to the vortex formed by stirring 100 mL of water at 60° C. with a 1 inch stir bar on a magnetic stirrer. The time for each sample to wet out and disperse is measured. Talc with 1% polyester C takes 25 minutes to wet out. The sample with 5% polyester C wets out within 2.5 minutes. The 10% and 15% polyester C samples wet out and disperse in 5 minutes and 10 minutes, respectively. Untreated fine talc does not wet out or disperse after 25 minutes of stirring.

EXAMPLE 9

This example demonstrates the upper amount of polymer that can be applied in fluid bed granulation.

Yellow iron oxide (CI Pigment Yellow 42) is granulated with polyester C. The process conditions are described as follows:

| | |
|---|---|
| Pigment Weight | 4 Kg |
| Polymer Dispersion Weight | 9 Kg of 28% polyester C |
| Inlet Temperature | 57.7° C. |
| Bed Temperature | 34.9° C. |
| Outlet Temperature | 32.3° C. |
| Air Flow | 400 m$^3$/h |
| Atomization Pressure | 2.5 bar |
| Spraying Time | 101 min. |

The product is a free flowing granular material with the composition of 61.4% pigment and 38.6% polymer.

Additional polymer is applied to this material as follows:

| | |
|---|---|
| Weight of granules | 4 Kg |
| Polymer Dispersion Weight | 7.243 Kg of 28% polyester C |
| Inlet Temperature | 56.6° C. |
| Bed Temperature | 37.5° C. |
| Outlet Temperature | 36.1° C. |
| Air Flow | 400 m$^3$/h |
| Atomization Pressure | 2.5 bar |
| Spraying Time | 100 min. |

Spraying is suspended and a sample is taken after 3.243 Kg of dispersion has been dispensed. This represents a composition of 50% pigment and 50% polymer. The final product is a free flowing granular material with the composition of 40.4% pigment and 59.6% polymer. The particle size distribution of each sample is shown below:

| Particle Size (micron) | Wt. % Polyester | | |
|---|---|---|---|
| | 38.6 | 50 | 59.6 |
| >850 | 0.01 | 0.03 | 0.13 |
| 425–850 | 6.72 | 39.94 | 66.95 |
| 250–425 | 49.06 | 54.37 | 31.13 |

| Particle Size | Wt. % Polyester | | |
|---|---|---|---|
| (micron) | 38.6 | 50 | 59.6 |
| 180–250 | 23.56 | 4.06 | 1.33 |
| 150–180 | 6.86 | 1.11 | 0.43 |
| 125–150 | 0.55 | 0.31 | 0.03 |
| <125 | 13.24 | 0.18 | 0 |

Each of the above compositions is dispersible in water as described in Example 2 and yields a dispersion which when applied to the skin has a smooth feel and forms a flexible colored film upon drying.

EXAMPLE 10

This example demonstrates the dispersibility and film-forming character of pigment material granulated with water dissipatable polyester.

Aqueous pigment dispersions are prepared as follows:

12.5 g of granulated pigment prepared in Example 5 are added to 62.5 g of water at 75° C. and mixed for 15 minutes. The dispersion is removed from heat and mixing is continued. When the dispersion reaches room temperature, 25 g of 2% Methocel E4M solution is added to increase the dispersion viscosity and mixed until well dispersed. The composition of the dispersion is 10% pigment, 2.5% polyester B, 0.5% Methocel E4M and 87% water. A 5 mil drawdown of the dispersion is made on a glass plate using a 4 inch blade applicator and allowed to air dry.

Another dispersion is prepared in the same manner except using untreated pigment (CI Pigment Yellow 42). The composition of this dispersion is 10% pigment, 0.5% Methocel and 89.5% water. A 5 mil drawdown is made on glass plate using a 4 inch blade applicator and allowed to air dry.

When the dried films are examined by viewing through the film, agglomerates are observed in the film made from untreated pigment. No agglomerates are observed in the film made with granulated pigment. The quality of each film is tested by drawing a tissue lightly over the surface. Pigment is removed from the untreated pigment film whereas little to no pigment is removed from the film prepared from granulated pigment.

EXAMPLE 11

Aqueous dispersions are prepared in the same manner as described in Example 9 except using untreated red iron oxide (CI Pigment Red 101) and granulated pigment material prepared in Example 6. Drawdowns of each dispersion are made on glass plate and allowed to air dry.

A 5 mil drawdown of the dispersion of untreated pigment cannot be made due to the large particle size. The dispersion of granulated pigment results in a smooth film of uniform color. Little to no color is removed when this film is rubbed lightly with a tissue.

EXAMPLE 12

This example demonstrates the use of granulated pigment material in a liquid make-up formulation.

A liquid make-up is prepared as follows:

| Water Phase: | |
|---|---|
| Water | 13.0 g |
| Methylparaben | 0.3 g |
| Triethanolamine | 2.0 g |
| Propylene Glycol | 6.0 g |
| CMC | 0.5 g |
| Lanox 55 | 2.0 g |
| Talc | 14.0 g |
| Titanium Dioxide/polyester B | 17.5 g |
| Yellow Iron Oxide/polyester B | 0.9 g |
| Red Iron Oxide/polyester B | 0.9 g |
| Oil Phase: | |
| Stearic Acid | 4.0 g |
| Propylparaben | 0.2 g |
| Mineral Oil | 20.0 g |
| Glyceryl Monostearate | 4.0 g |

Each phase is heated and mixed until uniform. The oil phase at 80° C. is added to the water phase also at 80° C. with agitation. The emulsion is mixed until the temperature reaches 35° C.

The feel, application and color strength of this formulation are acceptable for a liquid make-up.

The invention has been described in detail with particular reference to preferred embodiments thereof, but it will be understood that variations and modifications can be effected within the spirit and scope of the invention.

We claim:

1. In a process for producing a treated granular pigment product in a fluidized bed using a binder as a granulating assistant, the improvement comprising use of at least one water-dispersible, sulfonate group-containing polyester as said binder.

2. The process of claim 1 wherein said polyester comprises repeat units from
   (a) at least one difunctional dicarboxylic acid,
   (b) from about 2 to about 25 mole %, based on a total of all acid, hydroxyl and amino equivalents being equal to 200 mole %, of at least one difunctional sulfomonomer containing at least one sulfonate group of the formula $$-SO_3M$$

wherein M is H, a metal ion, or a nitrogen-containing basic group, and wherein said sulfonate group is attached directly to an aromatic nucleus and the functional groups of said sulfomonomer are hydroxy, carboxy, amino or a mixture thereof, and
   (c) at least one glycol or a mixture of a glycol and a diamine having two -NRH groups, the glycol containing two —CH$_2$—OH groups, wherein R is H or an alkyl group of 1 to 4 carbon atoms.

3. The process of claim 2 wherein said polyester comprises repeat units from
   (a) at least one difunctional aromatic, saturated aliphatic or saturated alicyclic dicarboxylic acid,
   (b) from about 4 to about 25 mole %, based on a total of all acid, hydroxyl and amino equivalents being equal to 200 mole %, of said difunctional sulfomonomer,
   (c) at least 0.1 mole %, based on a total of all acid, hydroxyl and amino equivalents being equal to 200 mole %, of a poly(ethylene glycol) of the formula:

$$H-(OCH_2-CH_2)_n-OH$$

wherein n is an integer of 1 to about 500, and
   (d) none to about 40 mole %, based on a total of all acid, hydroxyl and amino equivalents being equal to 200 mole %, of a difunctional hydroxycarboxylic acid having one —CR$_2$—OH group, and aminocarboxylic acid having one —NRH group, an aminoalcohol having one —CR$_2$—OH group and one —NRH group, a diamine having two —NRH groups, or a mixture thereof, wherein each R, independently, is as previously defined.

4. The process of claim 1 wherein said polyester is a polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows, wherein all stated mole percentages are based on the total of all acid, hydroxyl, and amino equivalents being equal to 200 mole %:

(a) at least one difunctional dicarboxylic acid;
(b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;
(c) at least one difunctional reactant selected from a glycol or a mixture of a glycol and diamine having two NRH groups, the glycol containing two CH$_2$OH groups of which
  (1) at least 15 mole % is a poly(ethylene glycol) having the structural formula

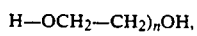

H—OCH$_2$—CH$_2$)$_n$OH, n being an integer of from 1 to about 20, or
  (2) of which from about 0.1 to less than about 15 mole % is a poly(ethylene glycol) having the structural formula

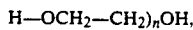

H—OCH$_2$—CH$_2$)$_n$OH, n being an integer of between 1 and about 500; and
(d) from none to about 40 mole % of difunctional reactant selected from hydroxycarboxylic acids having one —C(R)$_2$—OH group, aminocarboxylic acids having one —NRH group, amino-alcohols having one C(R)$_2$—OH group and one —NRH group, or mixtures of said difunctional reactants; wherein each R, independently, in the (c) and (d) reactants is H or an alkyl group of 1 to 4 carbon atoms.

5. The process of claim 2 wherein said polyester has an inherent viscosity of at least 0.2 measured in a 60/40 parts by weight solution of phenol/tetrachloroethane at 25° C. and at a concentration of 0.5 gram of polymer in 100 ml of the solvent; and a Tg as measured by DSC in the dry state of about 25° C. to about 90° C.

6. The process of claim 3 wherein said polyester has an inherent viscosity of at least 0.2 measured in a 60/40 parts by weight solution of phenol/tetrachloroethane at 25° C. and at a concentration of 0.5 gram of polymer in 100 ml of the solvent; and a Tg as measured by DSC in the dry state of about 25° C. to about 90° C.

7. The process of claim 4 wherein said polyester has an inherent viscosity of at least 0.2 measured in a 60/40 parts by weight solution of phenol/tetrachloroethane at 25° C. and at a concentration of 0.5 gram of polymer in 100 ml of the solvent; and a Tg as measured by DSC in the dry state of about 25° C. to about 90° C.

8. The process of claim 7 wherein said polyester consists essentially of an acid moiety of from about 75 to about 84 mole % isophthalic acid and conversely from about 25 to about 16 mole % 5-sodiosulfoisophthalic acid, and a glycol moiety of from about 45 to about 100 mole % diethyl@ne glycol and conversely from about 55 to about 0 mole % 1,4-cyclohexanedimethanol or ethylene glycol or mixtures thereof.

9. The process of claim 7 wherein said polyester consists essentially of an acid moiety of from about 80 to about 90 mole % isophthalic acid and conversely from about 20 to about 10 mole % 5-sodiosulfoisophthalic acid, and said glycol moiety comprises from about 50 to about 100 mole % diethylene glycol and conversely from about 50 to about 0 mole % 1,4-cyclohexanedimethanol.

10. The process of claim 7 wherein said polyester consists essentially of an acid moiety of from about 75 to about 85 mole % isophthalic acid and conversely from about 25 to about 15 mole % 5-sodiosulfoisophthalic acid, and said glycol moiety comprises from about 0 to about 20 mole % diethylene glycol and conversely from about 100 to about 80 mole % 1,4-cyclohexanedimethanol.

11. The process of claim 1 wherein said polyester consists essentially of repeat units from about 89 mole % isophthalic acid, about 11 mole % 5-sodiosulfoisophthalic acid, and 100 mole % diethylene glycol, based on a total of 200 mole percent.

12. The process of claim 1 wherein said polyester consists essentially of repeat units from about 89 mole % isophthalic acid, about 11 mole % 5-sodiosulfoisophthalic acid, about 78 mole % diethylene glycol, and about 22 mole % 1,4-cyclohexanedimethanol.

13. The process of claim 1 wherein said polyester consists essentially of repeat units from about 82 mole % isophthalic acid, about 18 mole % 5-sodiosulfoisophthalic acid, about 54 mole % diethylene glycol, and about 48 mole % 1,4-cyclohexanedimethanol.

14. The process of claim 1 wherein said polyester consists essentially of repeat units from about 80 mole % isophthalic acid, about 20 mole % 5.sodiosulfoisophthalic acid, about 11 mole % diethylene glycol, and about 89 mole % 1,4-cyclohexanedimethanol.

15. The process of claim 1 wherein said pigment is selected from the group consisting of iron oxide, a ferric ammonium ferrocyanide, manganese violet, ultramarine blue, chrome oxide, talc, zeolite, kaolin, titanium dioxide, mica, bismuth oxychloride, titanated mica, phthalocyanine blue, phthalocyanine green, diarylide yellow, diarylide orange, toluidine red, litho red, naphthol red, naphthol brown, a colorant containing two reactive primary alcohols, acid, ester or acetyloxy groups copolymerized with nylon, polyethylene or a polyester, and a mixture thereof.

16. The process of claim 1 wherein said pigment is one or a mixture of the following color index materials: C.I. Pigment Yellow 17, C.I. Pigment Blue 27, C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C.I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C.I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I Pigment Red 22, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, or C.I. Pigment Metal 2.

17. The process of claim 1 wherein said treated granular pigment product is prepared by spraying an aqueous dispersion of said polyester onto a fluidized bed consisting essentially of a blowing stream of gas upwardly through a bed of pigment powder.

18. The process of claim 1 wherein water or an aqueous solution is dispensed onto the fluidized bed which consists essentially of pigment powder blended with said polyester.

19. The process of claim 17 wherein the aqueous dispersion of polyester contains about 5 to about 50 weight % of the polyester.

20. The process of claim 17 wherein the aqueous dispersion of polyester contains about 15 to about 30 weight % of the polyester.

21. The process of claim 1 wherein the pigment/polyester weight ratio is about 50/50 to about 95/5.

22. The process of claim 1 wherein the pigment/polyester weight ratio is about 60/40 to about 90/10.

23. The process of claim 1 wherein the pigment/polyester weight ratio is about 70/30 to about 85/15.

24. The process of claim 1 comprising the steps of:
   (1) contacting water and the polyester and agitating at about 75° C. to about 90° C. to form an aqueous dispersion containing about 5 to about 50 weight % polyester,
   (2) charging pigment powder into a bowl of a fluidizing apparatus and blowing heated air through the pigment powder to form a fluidized bed,
   (3) spraying the aqueous dispersion formed from step (1) onto the fluidized bed formed in step (2) to produce a treated granular pigment product,
   (4) drying the treated granular pigment product.

25. The process of claim 24 wherein the concentration of polyester in the aqueous dispersion is about 15 to about 30 weight %, the temperature of inlet air for the fluidized bed is about 20° C. to about 90° C., the temperature of outlet air for the fluidized bed is about 25° C. to about 60° C., the spraying of the aqueous dispersion is through a nozzle resulting in atomization into a space above the fluidized bed, and drying of the product is accomplished by continuing fluidization after the desired amount of aqueous dispersion has been dispensed.

26. The process of claim 25 wherein step (3) is carried out from about 30 minutes to about 3 hours, and the drying time of step (4) is about 1 to about 30 minutes.

27. The process of claim 1 wherein said treated, granular pigment product is low dusting, free flowing and contains less than 5 weight % moisture.

28. The process of claim 27 wherein said treated, granular pigment product contains less than 2 weight % moisture.

29. The process of claim 1 carried out batchwise.

30. The process of claim 1 wherein the treated, granular pigment product has an average particle size between about 75 μm and about 1000 μm.

31. The process of claim 1 wherein the treated, granular pigment product has an average particle size between about 125 μm and about 500 μm.

* * * * *

UNITED STATES PATENT AND TRADEMARK OFFICE
CERTIFICATE OF CORRECTION

PATENT NO. : 5,143,671

DATED : September 1, 1992

INVENTOR(S) : Kimberly T. Peters et al.

It is certified that error appears in the above-identified patent and that said Letters Patent is hereby corrected as shown below:

Column 19, line 34 (Claim 4, line 27), "NRH" should be --- -NRH ---.

Column 19, line 34 (Claim 4, line 27), "CH2" should be --- -CH$_2$- ---.

Column 19, line 39 (Claim 4, line 32), the structural formula should be deleted and --- H$($OCH$_2$-CH$_2)_n$OH, --- should be inserted therefor.

Column 19, line 46 (Claim 4, line 39), the structural formula should be deleted and --- H$($OCH$_2$-CH$_2)_n$OH, --- should be inserted therefor.

Column 19, line 54 (Claim 4, line 47), "C(R)$_2$-OH" should be --- -C(R)$_2$-OH ---.

Column 20, line 14 (Claim 8, line 6), "diethyl@ne" should be ---diethylene---.

Signed and Sealed this

Fourteenth Day of September, 1993

*Attest:*

BRUCE LEHMAN

*Attesting Officer*     *Commissioner of Patents and Trademarks*